(No Model.) 6 Sheets—Sheet 2.
O. B. SCHMALL.
TILE MACHINE.
No. 539,489. Patented May 21, 1895.
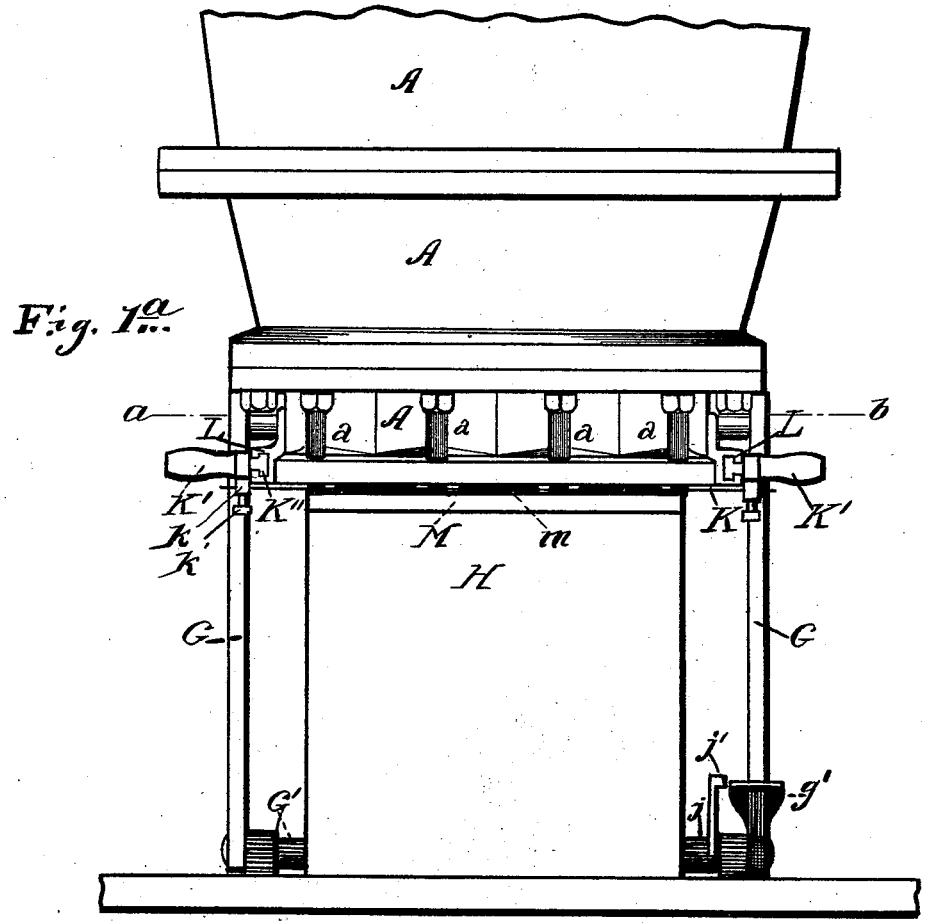
Fig. 1ª
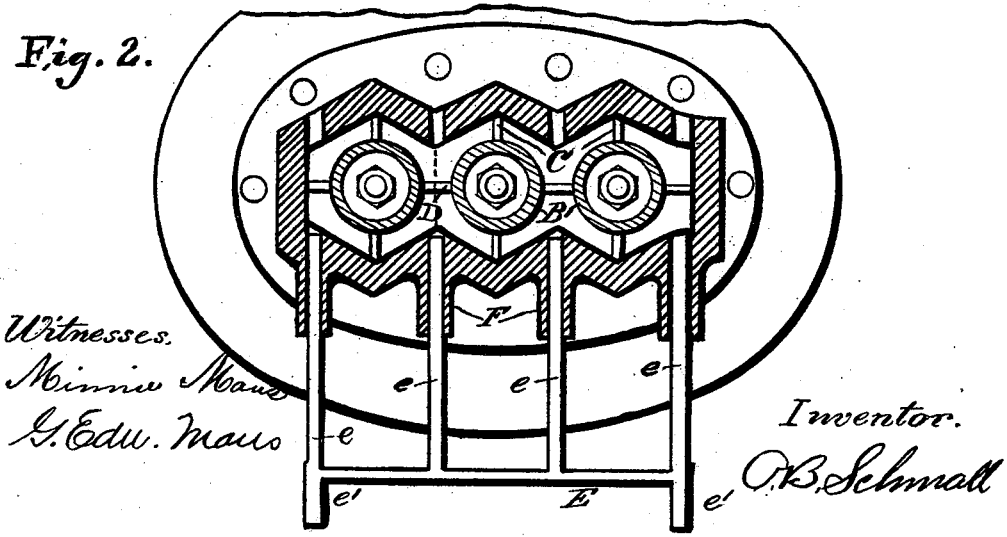
Fig. 2.
Witnesses.
Minnie Maus
G. Edw. Maus
Inventor.
O. B. Schmall (No Model.) 6 Sheets—Sheet 3.

O. B. SCHMALL.
TILE MACHINE.

No. 539,489. Patented May 21, 1895.

Witnesses.
Scott Bonham,
W. D. Sexton

Inventor.
Octavius B. Schmall (No Model.) 6 Sheets—Sheet 4.
O. B. SCHMALL.
TILE MACHINE.

No. 539,489. Patented May 21, 1895.

Witnesses.
George A. Werner
H. E. Hannaford

Inventor.
O. B. Schmall.

(No Model.) 6 Sheets—Sheet 5.

O. B. SCHMALL.
TILE MACHINE.

No. 539,489. Patented May 21, 1895.

Witnesses
Minnie Maus
G. Edw. Maus

Inventor
Octavius B. Schmall (No Model.) 6 Sheets—Sheet 6.

O. B. SCHMALL.
TILE MACHINE.

No. 539,489. Patented May 21, 1895.

Witnesses.
Minnie Maus
G. Edw. Maus

Inventor.
Octavius B. Schmall

THE NORRIS PETERS CO., PHOTO-LITHO., WASHINGTON, D. C.

UNITED STATES PATENT OFFICE.

OCTAVIUS B. SCHMALL, OF CINCINNATI, OHIO.

TILE-MACHINE.

SPECIFICATION forming part of Letters Patent No. 539,489, dated May 21, 1895.

Application filed March 15, 1894. Serial No. 503,813. (No model.)

*To all whom it may concern:*

Be it known that I, OCTAVIUS B. SCHMALL, of Cincinnati, in the county of Hamilton, State of Ohio, have invented certain new and useful Improvements in Tile-Machines, of which the following is a specification.

My invention relates to improvements in that class of brick or tile machines used for molding plastic material into form, being especially adapted to the vertical machines, but is equally applicable to horizontal machines, and is specifically designed to manufacture the product set forth and described in Patent No. 513,423, and similar products, the principal objects being to form the obtusely angular, ridged bearing surfaces, and to cut the slots across the ends of the block, without defacing the walls of the product. I accomplish these objects by the means set forth and claimed in the following specification, and illustrated in the accompanying drawings, in which—

Figure 1:
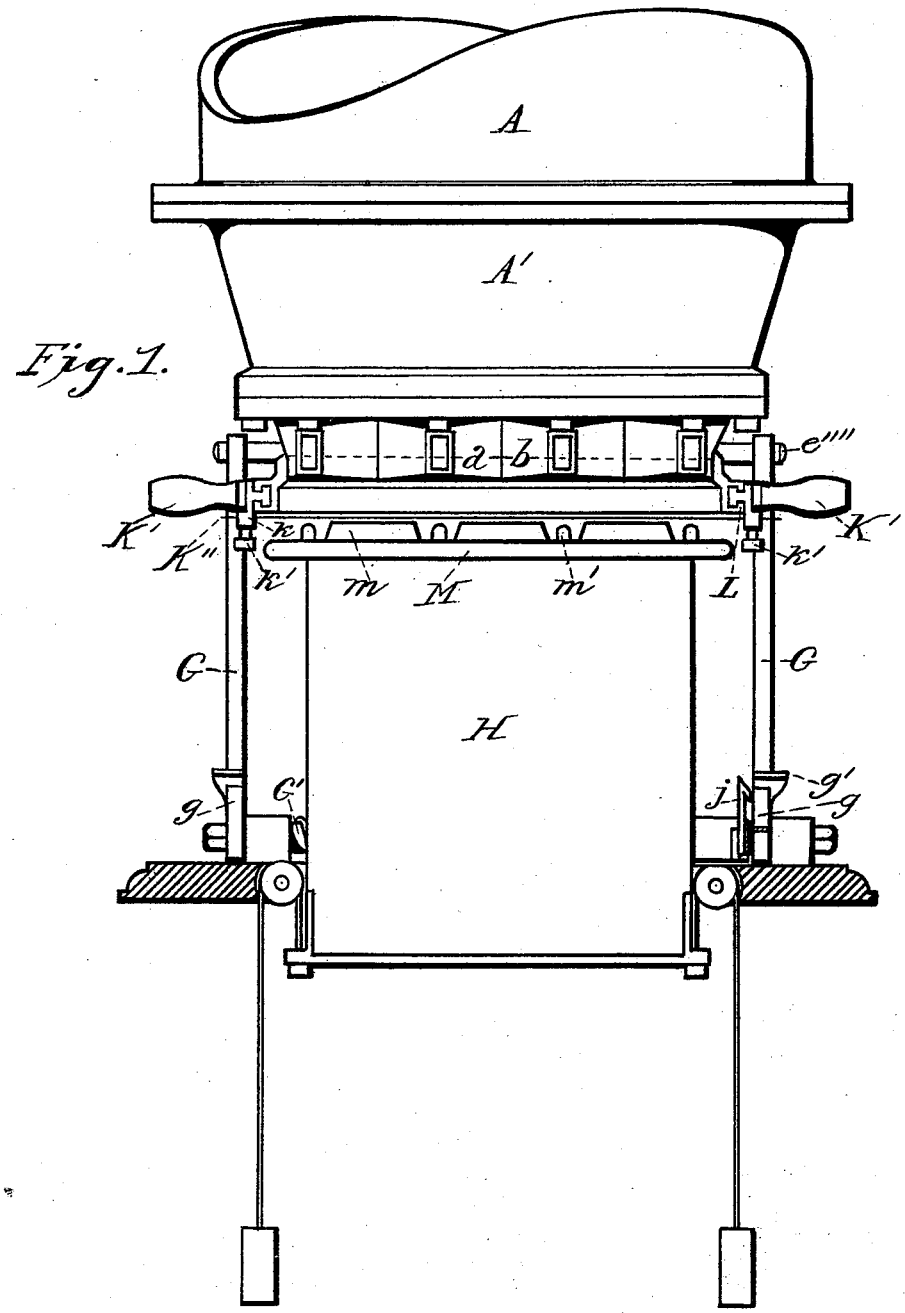
Figure 3:
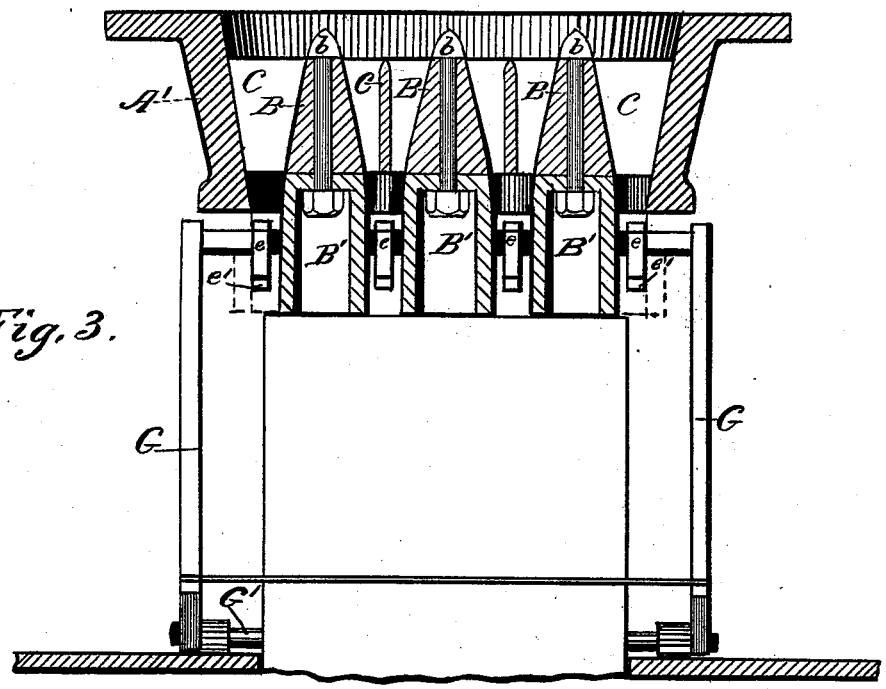
Figure 4:
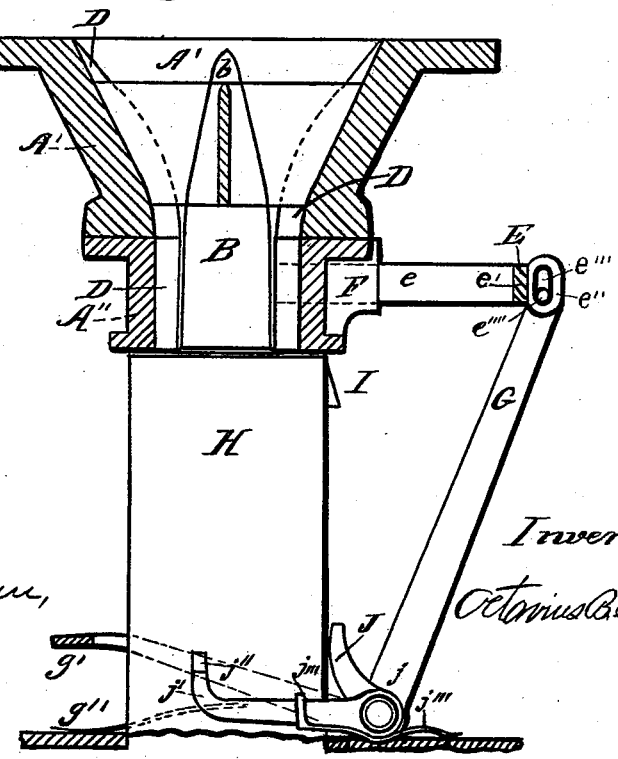
Figure 5:
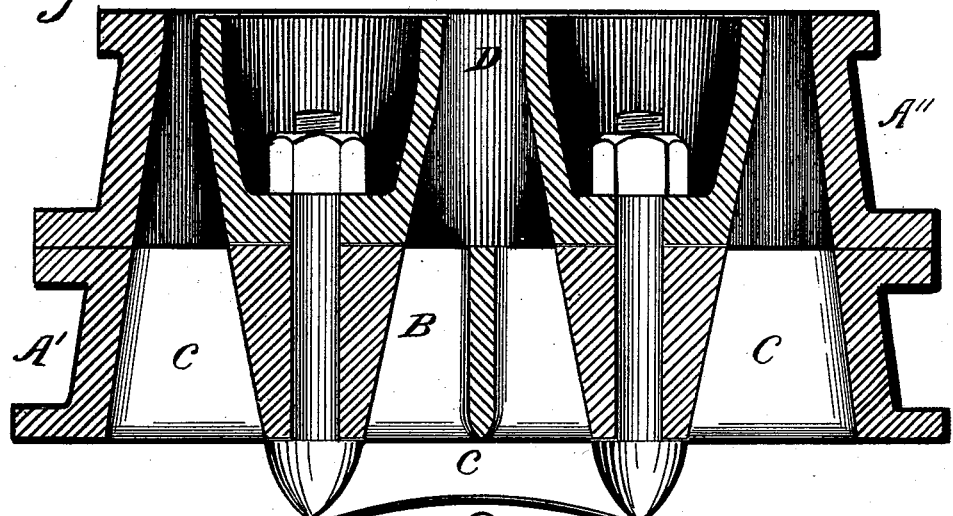
Figure 6:
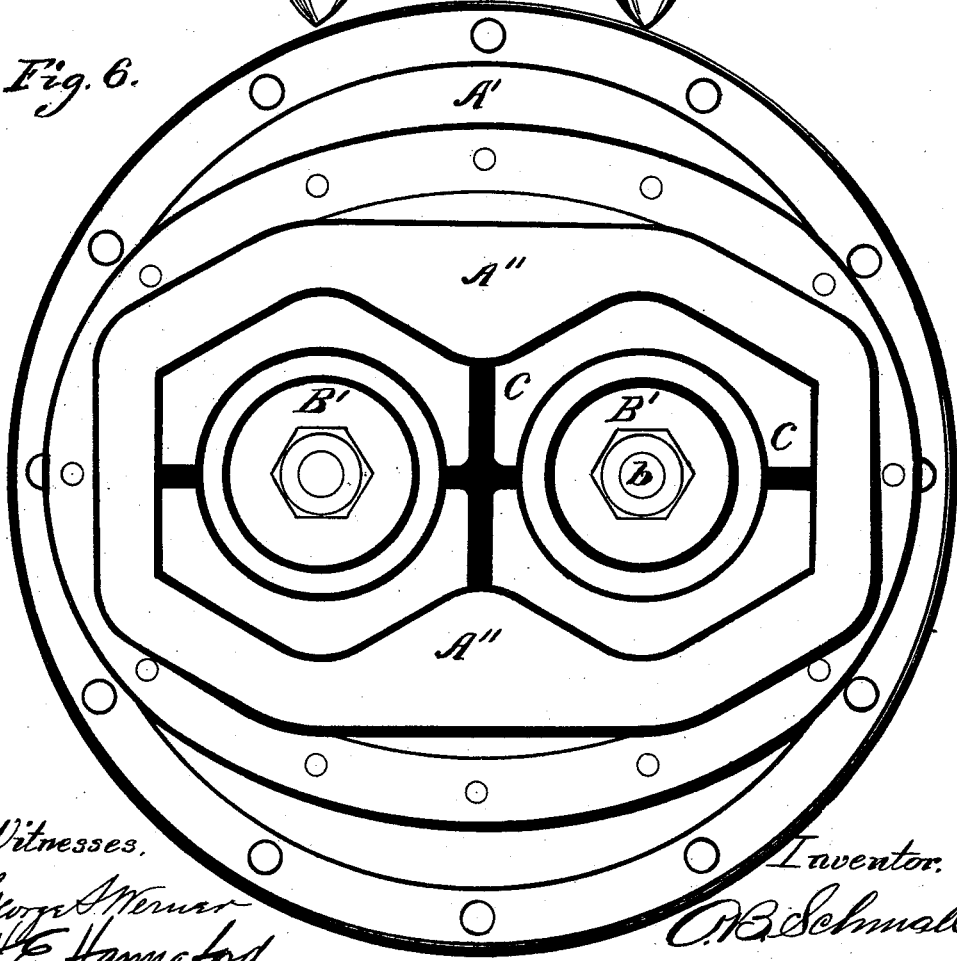
Figure 7:
Figure 8:
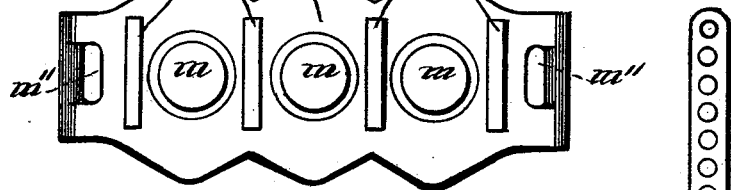
Figure 9:
Figure 10:
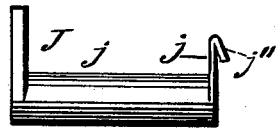
Figure 11:
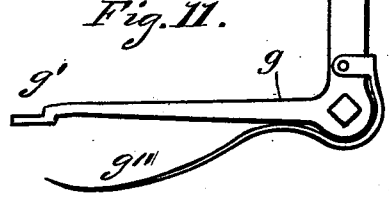
Figure 12:
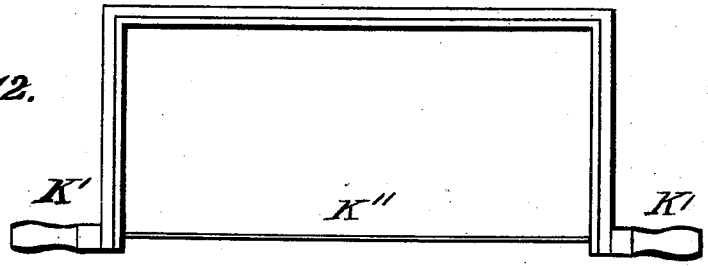
Figure 13:
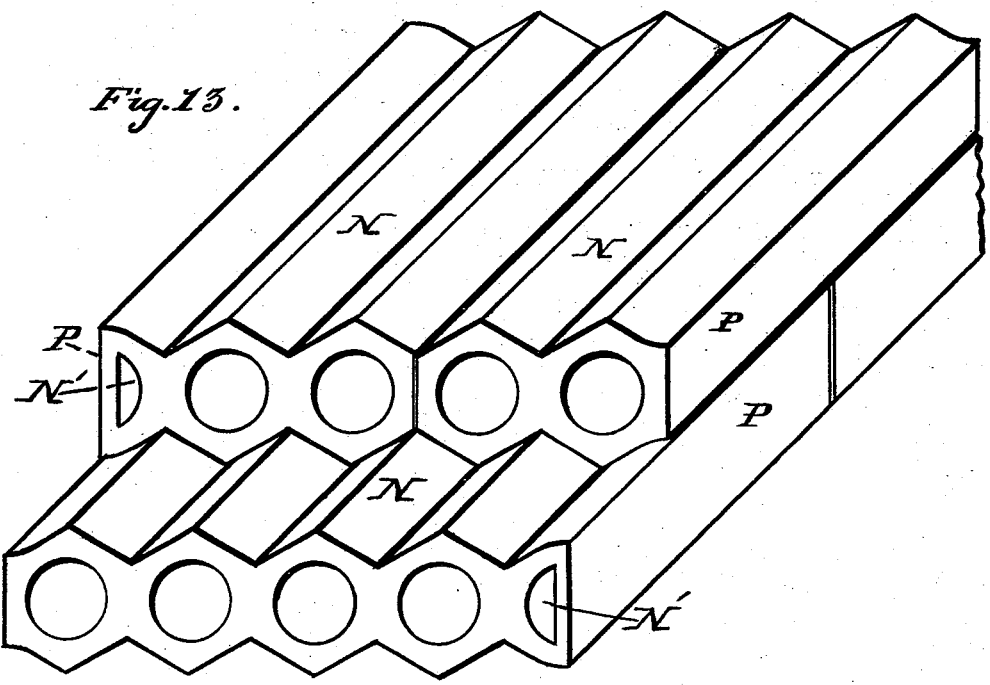
Figure 14:
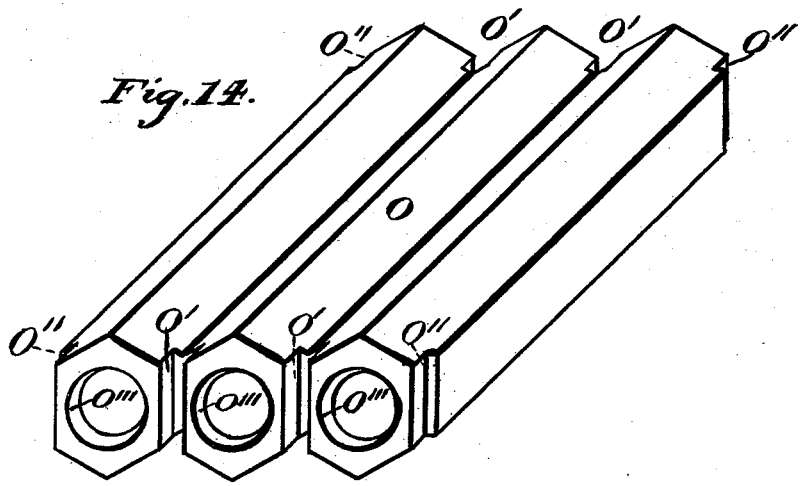

Figure 1 is an elevation, front view, of my improved device with the base-plate in section and illustrates the adjustment to the machine proper, the arrangement of the slotting device in the rear, the cut-off frame in its guideways, and a simple method of balancing the movable table. Fig. 1ª is an elevation of my device, showing connection with the machine. Fig. 2 is a section through *a b* and illustrates the peculiar arrangement of the forming-surfaces and the location of the templets within the enlarged spaces of the die. Fig. 3 is a section through the barrel, web, and templets, front view. Fig. 4 is a sectional elevation of the die and slotting device, lateral view. Fig. 5 is a sectional elevation, and Fig. 6 a plan or end view, of a modified form of die. Fig. 7 is an elevation of the table or tile-plate. Fig. 8 is a plan view of the same. Fig. 9 is a detail of the rocking shaft. Fig. 10 represents pawls and thimble. Fig. 11 shows the bell-crank lever with spring in position. Fig. 12 is a detail of the cut-off frame. Fig. 13 is a perspective of the plain product of this die and illustrates the peculiar interlocking surfaces and interchangeability of blocks. Fig. 14 is a perspective view of the product with slotted ends and beveled perforations.

In the above illustrations, A, represents the barrel of the machine; A', the die proper; B, the templets; C, the web connecting the templets with the die; D, the angular ridges upon the forming surface of the die; E, the slotting frame; F, the plunger-guides; G, the lever for operating the slotting-frame; H, the balanced table; I, the stop-lug; J, the locking pawl; K, the cut-off frame; L, the guideways for the cut-off frame; M, the table plate; N, the plane, and O the slotted product.

P, represents the preferred form of external wall surfaces.

In the construction of this device, the barrel, A', and the web, C, are cast together. The templets, B, are partly formed in the web, with the centers cored or bored out for the reception of the conical headed steel bolt, *b*, which connects the bell, B', to the web, as shown in Figs. 3 and 5, the bells being detachably connected to the web, for the purpose of introducing chilled or hardened surfaces where the die is most subjected to wear, and for facilitating the grinding or facing up the parts. This arrangement of detail reduces the cost of construction about one-half, while the length of life of the die, is more than doubled, and the advantage of duplication of any of the parts which are broken or defaced by wear, is secured without the expense of making the whole die.

The bells, B', may be made round or polygonal, and of any length required, the barrel extension, A'', being carried out to correspond. In the manufacture of the slotted product, the bells, B, are necessarily made long enough to descend below the lower edge of the slotting plungers, *e*, while the barrel extension, A'', is provided with guideways, F, in the rear, and slotted openings, *a*, in front, for discharging the material displaced by the plungers. The plunger-frame, E, consists of a series of plungers, *e, e, e, e*, mounted on a bar *e'*, which is provided with backward projecting lugs, *e''*, having vertical slots, *e'''*, for the reception of the connecting bar, *e''''*, which connects the bell crank lever with the slotting-frame. The lever, G, is provided with an arm, *g*, on which is mounted a shoe or foot rest, *g'*. Under this shoe, a spring, *g''*, for lifting the shoe, and withdrawing the plungers from the die, is secured. The table, H, is balanced in the usual manner, and the length of travel limited in the usual way, but provision for stopping its motion before the end of its journey is provided by means of the stop lug, I, and the pawl, J, which engage while the plunger is being operated. The pawl, J, is mounted upon a thimble, $j$, fitted loosely to shaft, G'. At its opposite extremity, the thimble, $j$, is provided with an arm, $j'$, extending at a right angle to the shaft, G'. On its outer end this arm carries a lug, $j''$, adapted to engage the treadle arm, $g'$, and disengage the pawl from the lug, and permit the descent of the table to the end of its course, which brings the middle of the elongated slot made by the plungers, directly opposite the cut-off, K, which runs in guides, L, across the lower face of the die. This cut-off consists of a frame, K, with handles, K', and cut-off wire, K'', mounted in downward-projecting lugs, $k$, and there secured by set screws, $k'$.

The table, H, is provided with a rest or support, M. This table-plate has a series of cylindrical projections, $m$, corresponding in number to the templets in the die. These projections may form the frustum of a cone, and be slightly larger at their base than the perforations in the tile.

In the manufacture of the slotted product, it is found desirable to place a series of transverse cleats, $m'$, corresponding in width and height, to the thickness of, and one half the width of, the plungers, tapering slightly from the base to the top, or rounded off at the top to correspond with the slot desired in the product. These base or table plates are also provided at each end with a hand hole, $m''$, for lifting the product from the table, and off-bearing to the drying-room.

The die may be made with any number of templets arranged in a line, the advantages peculiar to this construction being, that it equalizes the distribution of material about the templets, and furnishes a product having uniform density throughout, with but one line of centers to contract upon, while drying and burning. Consequently there is little or no loss in its manufacture. No peculiar mechanical skill is required in the construction of the die, to give uniform density to the walls of the product, and no special mixtures of clays are required to secure the product from breakage in curing. Any clays suitable for drain tile, sewer pipe, or terra cotta work of any description, afford uniformly good results with this construction of die.

The operation is as follows: The die, A', being adjusted to the machine, A, and the pressure turned on, the plastic material is forced through the die to the table, H, or bearing plate, M, the table being forced downward by the descent of the tile, until the locking lug engages the pawl, J, which stops the descent of the table. The operator now places his foot upon the treadle, $g'$, bearing it down until it comes in contact with the floor. This throws the plungers through the die. He then raises his foot, the treadle is lifted by the spring, the plunger withdrawn from the die, and the pawl disengaged from the lug. The table now descends until the middle of the oblong holes made by the plungers, comes directly opposite the cut-off, at the lower face of the die, at which point the table stops. The pressure being now removed, the operator grasps the handles, K'', of the cut-off, and draws them toward him, cutting off the section directly through the middle of the slots. The section is then removed, the face plate, M, is placed upon the table, which then re-ascends to the lower face of the die, and the operation is repeated. This repetition of the operation, slots both ends of the product.

Having thus fully set forth and described my invention, what I claim as new, and desire to secure by Letters Patent, is—

1. In a tile machine, in combination, a die having a series of templets arranged in a line between regularly angled channeled and ridged forming surfaces, the ridges being diametrically opposite, and arranged to project between the templets, with each of the templets connected by web to the opposite inner faces of the die, substantially as shown and described.

2. In combination, a die having a barrel, and templet-carrying web, with detachable bells connected therewith, and an extension of the barrel to correspond with the templets, as and for the purpose set forth.

3. In combination, a die having a series of templets arranged in a line, with a series of slotting plungers arranged transversely thereto, and operating to slot the product between the templets as it flows through the die, substantially as shown and described.

4. In combination, a tile machine having a die substantially as shown, a slotting frame mounted thereon, and a bell crank lever mounted upon the floor or base plate of the machine, and connected with the slotting frame for operating the plungers, substantially as and for the purpose specified.

5. In combination, a tile machine having a forming die connected therewith, and a slotting-frame mounted thereon; bell crank levers for operating the slotting frames, and a balanced movable table acting in conjunction with the machine, as and for the purpose specified.

6. In combination, a tile machine and balanced table acting in conjunction, a series of slotting plungers mounted in a frame and operated substantially as shown, and a locking lug and pawl for controlling the movements of the table, substantially as and for the purpose specified.

7. In combination, a tile machine having a die with a series of templets arranged in a line, for forming a multiple duct tile or pipe, a table acting in conjunction with such machine, and surmounted by a base or tile plate, having a series of tapering projections, corresponding in number to the templets in the die, for the purpose specified.

8. In combination, a base or tile-plate, M, having a series of tapering projections, $m$, mounted thereon, and a series of transverse cleats, $m'$, running across the plate, substantially as shown, and provided with hand holes, $m''$, substantially as and for the purpose specified.

9. In combination, the product of a die substantially as shown, having a series of perforations arranged in a line, and a series of regular, obtusely-angular ridges and channels running parallel with the perforations, upon the bearing surfaces of the block; the channels arranged to fall between the perforations, and form interlocking surfaces with duplicate blocks, substantially as shown and described.

10. In combination, the product of a die substantially as shown, having ridged and channeled bearing surfaces, and a series of parallel perforations, with vertical slots across the ends of the block, between the perforations, all substantially as shown and described.

11. In combination, the product of a die, substantially as shown, having corrugated bearing surfaces, and parallel perforations, flared outward at their ends, all substantially as shown and described.

OCTAVIUS B. SCHMALL.

Attest:
A. G. MATHER,
LOUIS R. LUEBBERT.